United States Patent
Ozawa

(10) Patent No.: US 9,112,961 B2
(45) Date of Patent: Aug. 18, 2015

(54) AUDIO QUALITY ANALYZING DEVICE, AUDIO QUALITY ANALYZING METHOD, AND PROGRAM

(75) Inventor: Kazunori Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 711 days.

(21) Appl. No.: 13/394,796

(22) PCT Filed: Sep. 15, 2010

(86) PCT No.: PCT/JP2010/065938
§ 371 (c)(1),
(2), (4) Date: Mar. 7, 2012

(87) PCT Pub. No.: WO2011/034090
PCT Pub. Date: Mar. 24, 2011

(65) Prior Publication Data
US 2012/0170761 A1    Jul. 5, 2012

(30) Foreign Application Priority Data

Sep. 18, 2009  (JP) .................. 2009-217753
Sep. 18, 2009  (JP) .................. 2009-217754
Sep. 18, 2009  (JP) .................. 2009-217756

(51) Int. Cl.
*H04M 3/22*    (2006.01)
*H04L 12/26*   (2006.01)
(Continued)

(52) U.S. Cl.
CPC ........... *H04M 3/2236* (2013.01); *H04L 43/028* (2013.01); *H04L 65/1006* (2013.01);
(Continued)

(58) Field of Classification Search
CPC ...... H04R 29/00; H04R 5/033; G10K 11/002; G10L 21/0316; G10L 21/02; H04L 43/028; H04L 65/1006; H04L 65/1069; H04L 65/608; H04L 65/80; H04M 7/006; H04M 3/2236
USPC ............................................ 375/351; 381/56
See application file for complete search history.

(56) References Cited

U.S. PATENT DOCUMENTS 5,333,153 A  *  7/1994  Brown et al. ................. 375/351
6,061,444 A     5/2000  Kawahara et al.
(Continued)

FOREIGN PATENT DOCUMENTS

JP    H7-303068 A    11/1995
JP    2003-087321 A   3/2003
(Continued)

OTHER PUBLICATIONS

International Search Report in PCT/JP2010/065938 dated Dec. 14, 2010 (English Translation Thereof).
(Continued)

*Primary Examiner* — Charles C Jiang
*Assistant Examiner* — Kyaw Z Soe
(74) *Attorney, Agent, or Firm* — McGinn IP Law Group, PLLC

(57) ABSTRACT

During audio communication between terminals, an audio quality analyzing device picks up from a network a packet containing a bit stream obtained by compression encoding of audio sent by at least one of the terminals. The device has an audio quality analyzing unit that, in addition to analyzing a header of the packet picked up, performs at least one of: an analysis of a payload header and an analysis of the bit stream contained in the payload, detects deterioration in the quality of the audio communication service, and notifies a result of the detection to an upper level device.

18 Claims, 11 Drawing Sheets

(51) Int. Cl.
*H04M 7/00* (2006.01)
*H04L 29/06* (2006.01)

(52) U.S. Cl.
CPC .......... *H04L65/1069* (2013.01); *H04L 65/608* (2013.01); *H04L 65/80* (2013.01); *H04M 7/006* (2013.01); *H04L 43/087* (2013.01); *H04L 43/0829* (2013.01); *H04L 43/0858* (2013.01); *H04L 43/0864* (2013.01); *H04M 2207/185* (2013.01)

(56) References Cited

U.S. PATENT DOCUMENTS

| | | | |
|---|---|---|---|
| 6,747,977 B1* | 6/2004 | Smith et al. | 370/395.64 |
| 7,142,506 B1* | 11/2006 | Pogrebinsky | 370/229 |
| 7,477,631 B2* | 1/2009 | Chen et al. | 370/338 |
| 8,213,327 B2* | 7/2012 | Ariyoshi et al. | 370/252 |
| 8,254,295 B2* | 8/2012 | Choi et al. | 370/280 |
| 8,548,513 B2* | 10/2013 | Yoon et al. | 455/509 |
| 8,553,520 B2* | 10/2013 | Rajasekar et al. | 370/201 |
| 8,649,346 B2* | 2/2014 | Park | 370/329 |
| 2002/0015387 A1* | 2/2002 | Houh | 370/250 |
| 2004/0073641 A1* | 4/2004 | Minhazuddin et al. | 709/223 |
| 2005/0094580 A1* | 5/2005 | Kumar et al. | 370/260 |
| 2005/0144006 A1* | 6/2005 | Oh | 704/273 |
| 2006/0092927 A1* | 5/2006 | Li et al. | 370/352 |
| 2006/0149536 A1* | 7/2006 | Li | 704/215 |
| 2006/0153174 A1* | 7/2006 | Towns-von Stauber et al. | 370/356 |
| 2006/0222155 A1* | 10/2006 | Summers et al. | 379/202.01 |
| 2007/0061138 A1* | 3/2007 | Chen et al. | 704/230 |
| 2007/0079223 A1* | 4/2007 | Mondin et al. | 714/780 |
| 2007/0189411 A1* | 8/2007 | Goss | 375/272 |
| 2007/0230462 A1* | 10/2007 | Nakayama | 370/389 |
| 2007/0242663 A1 | 10/2007 | Nakazawa et al. | |
| 2008/0002842 A1* | 1/2008 | Neusinger et al. | 381/119 |
| 2009/0103743 A1 | 4/2009 | Honda | |
| 2009/0213746 A1 | 8/2009 | Ariyoshi et al. | |
| 2009/0285110 A1* | 11/2009 | Yamasaki | 370/252 |
| 2010/0037114 A1* | 2/2010 | Huang et al. | 714/749 |
| 2010/0195490 A1* | 8/2010 | Nakazawa et al. | 370/216 |
| 2011/0075852 A1* | 3/2011 | Egi et al. | 381/56 |
| 2014/0198746 A1* | 7/2014 | Ahn et al. | 370/329 |

FOREIGN PATENT DOCUMENTS

| | | |
|---|---|---|
| JP | 2003-244235 A | 8/2003 |
| JP | 2004-289748 A | 10/2004 |
| JP | 2004-328345 A | 11/2004 |
| JP | 2005-057331 A | 3/2005 |
| JP | 2005-123688 A | 5/2005 |
| JP | 2005-176071 A | 6/2005 |
| JP | 2007-036400 A | 2/2007 |
| JP | 2007-104167 A | 4/2007 |
| JP | 2007-288342 A | 11/2007 |
| JP | 2008-160711 A | 7/2008 |
| JP | 2008-172365 A | 7/2008 |
| JP | 2009-105620 A | 5/2009 |
| JP | 2009-206767 A | 9/2009 |
| WO | WO2007/078008 A1 | 7/2007 |

OTHER PUBLICATIONS

Notice of Grounds for Rejection dated Jun. 17, 2014, with English translation.

* cited by examiner

AUDIO QUALITY ANALYZING DEVICE, AUDIO QUALITY ANALYZING METHOD, AND PROGRAM

REFERENCE TO RELATED APPLICATION

This application is based upon and claims the benefits of the priority of Japanese patent application No. 2009-217753 filed on Sep. 18, 2009, Japanese patent application No. 2009-217754 filed on Sep. 18, 2009 and Japanese patent application No. 2009-217756 filed on Sep. 18, 2009, the disclosure of which is incorporated herein in their entirety by reference thereto.

TECHNICAL FIELD

This invention relates to an audio quality analyzing device, an audio quality analyzing method, and a computer program, and in particular, relates to an audio quality analyzing device, an audio quality analyzing method, and a computer program, in an audio communication service by audio packets that contain audio.

BACKGROUND

A device is known, which, during an audio communication service, can pick up audio packets passing through a network (for example, an IP (Internet Protocol) network, an NGN (Next Generation Network), the Internet, a mobile network, or the like), analyze audio quality, and detect deterioration in the audio quality. For example, by performing a header analysis of a UDP header or an RTP header, or an RTCP analysis or the like, it is possible to detect packet loss rate, round trip delay or one way delay, jitter, and the like. Furthermore, in a case where at least one of these exceeds a predetermined threshold, it is possible to determine deterioration of the audio quality, and to output an alarm or the like. An analysis result thereof or deterioration in audio quality is notified to an upper level monitoring device, and it is also possible to output and display this in a monitoring terminal, as it is, or after processing and editing.

Patent Document 1 discloses an example of the abovementioned audio quality analyzing device. According to Patent Document 1, use is made of a communication terminal provided with: a function 11c that assigns a time stamp of time-of-receipt to an audio/image packet received from a communication party and collects the time stamps, a function 11h that collects self-performance data, functions 11e, 11f, and 11g that compute information of transmission delay, packet loss rate, and fluctuations, arising from quality deterioration, based on information of sequence number and time stamp of collected audio/image packets and information of time stamp at time of transmission and sequence number from the communication party, a function 11i that determines whether or not these computed quality deterioration causes and information of the collected performance data exceed a threshold, and a function 11j that gives notification in a monitor that there is a possibility of the occurrence of quality deterioration in a case where the threshold is exceeded according to the determination, so as to enable advance notification of quality deterioration of multimedia communication to be given with high accuracy to a user.

Furthermore, Patent Document 2 discloses a configuration of an audio quality adjustment device for an IP network system provided with a plurality of VoIP gateway devices that perform relaying for packet forwarding with respect to IP (Internet Protocol) and transmission of audio signals in an existing public network, the configuration being provided with an evaluation means that instantaneously evaluates call audio quality for respective lines during a call via a transmission path by way of an IP network, based on information regarding VoIP packets reaching the VoIP gateway devices via the IP network, and an adjustment means that adjusts processing in which a VoIP gateway that is a source of a VoIP packet transmits to the IP network in accordance with the respective lines during the call.

Furthermore, Patent Document 3 discloses a communication device provided with a function to curtail deterioration of audio quality as much as possible, by embedding detection information of errors in ups of fixed length cells into which audio packets are packed when multiplexing packeted audio, extracting audio packets on a receiving side and measuring an error state of a communication path from the embedded error detection information, notifying transmission error excess to a transmission side in a case of exceeding a pre-set error generation condition, switching an audio encoding method to an encoding method with a strong audio quality characteristic with respect to encoding error in a transmission side communication device that receives this transmission error excess notification, and also controlling a multiplexing method.

Patent Document 4 discloses a configuration having a buffer that absorbs fluctuations in a packet switching network in a media stream relay device that relays between a circuit switching network and a packet switching network, wherein packet congestion and loss can be reduced.

Patent Document 5 discloses an audio quality monitoring method of sending a test audio signal to an IP network from a media gateway in a case where a test is necessary during system operation, picking up an audio signal that has returned via the network, obtaining the difference from the test audio signal, and performing monitoring of audio quality according to the extent of the difference. Furthermore, Patent Document 5 describes cutting an echo component by an echo canceller, with respect to a test audio signal including an echo component, and performing performance monitoring of the echo canceller by monitoring operation of the echo canceller using the audio signal after cutting.

Patent Document 6 discloses a configuration provided with a function of measuring echo amount, in a terminal connected to a packet network. An echo measuring method disclosed in Patent Document 6, is, specifically, an analog acoustic method of measuring echo amount by measuring audio loop-back amount in respective parts of a VoP telephone, such as a handset (refer to paragraphs 0071 to 0073 in Patent Document 6.)

Patent Document 7 discloses a hybrid telephone system having an audio quality management function. A hybrid PBX described in the document has a test signal transmission function and a test result analysis function, and based on an analytic result thereof, optimizes the setting of each type of parameter with respect to audio quality in a call path with respect to an echo canceller.

[Patent Document 1]
Japanese Patent Kokai Publication No. JP-P2004-289748A
[Patent Document 2]
Japanese Patent Kokai Publication No. JP-P2005-57331A
[Patent Document 3]
Japanese Patent Kokai Publication No. JP-P2003-87321A
[Patent Document 4]
Japanese Patent Kokai Publication No. JP-P2007-288342A
[Patent Document 5]
Japanese Patent Kokai Publication No. JP-P2004-328345A
[Patent Document 6]
Japanese Patent Kokai Publication No. JP-P2003-244235A
[Patent Document 7]
Japanese Patent Kokai Publication No. JP-P2005-176071A

SUMMARY

The following analysis is given according to the present invention. It is to be noted that the entire disclosed contents of the abovementioned patent documents are incorporated herein by reference thereto. However, the abovementioned audio quality analyzing device must pass a test audio signal for analysis through a network and pick up a signal that is returned via the network to compare with the original signal, or must embed a test audio signal in a specific field within an audio packet to be sent from a transmission side device, and after reception thereof at a reception side device, extract the test audio signal to compare with the original test audio signal, so that there is a problem in that an unnecessary signal is passed through the network during service operation.

Furthermore, in order to reduce processing amount, the abovementioned audio quality analyzing device has a configuration to perform analysis of only packet headers or only RTCP analysis, so that there is a problem in that it is only possible to analyze for the presence of packet loss generation, packet loss rate, jitter, round trip delay or one-way delay. Therefore, analyzes outside of these are not possible: for example, analyses of deterioration of audio due to an occurrence of bit error in a case of including wireless transmission segments in a mobile network, or of whether or not a silence or fragmented communication due to an abnormality during audio calls occurs. It is to be noted that a fragmented communication is an event in which one party's voice does not reach the other party during a call.

It is an object of the present invention to provide an audio quality analyzing device, an audio quality analyzing method, and a program, which can realize analysis and detection of audio deterioration due to an occurrence of bit error as described above or of a silence or fragmented communication due to an abnormality in a device, without the necessity to pass a test audio signal through a network in service or without embedding a test audio signal in a specific field of an audio packet, as in the abovementioned audio quality analyzing devices.

According to a first aspect of the present invention there is provided an audio quality analyzing device comprising: an audio quality analyzing unit that picks up from a network a packet containing a bit stream obtained by compression encoding of audio sent by at least one terminal, during audio communication among terminals, and, in addition to analyzing a header of the packet, detects deterioration of audio communication service quality by performing at least one of: an analysis of a payload header and an analysis of the bit stream contained in the payload; and notifies a detection result to an upper level device.

According to a second aspect of the present invention there is provided an audio quality analyzing method comprising: picking up from a network a packet containing a bit stream obtained by compression encoding of audio sent by at least one terminal during audio communication among terminals, analyzing a header of the packet and also performing at least one of: an analysis of a payload header and an analysis of the bit stream contained in the payload, and detecting deterioration of audio communication service quality based on the analysis result, and notifying a detection result to an upper level device. The present method is linked with a specific apparatus, known as an audio quality analyzing device that picks up packets from a network as described above.

According to a third aspect of the present invention there is provided a computer program executing, on a computer system configuring an audio quality analyzing device, a process of picking up from a network a packet containing a bit stream obtained by compression encoding of audio sent by at least one terminal during audio communication among terminals, a process of analyzing a header of the packet and also performing at least one of: an analysis of a payload header and an analysis of the bit stream contained in the payload, and a process of detecting deterioration of audio communication service quality based on the analysis result and notifying a detection result to an upper level device. It is to be noted that the computer program can be recorded in a computer readable storage medium. That is, the present invention can be embodied as a computer program product.

The meritorious effects of the present invention are summarized as follows. According to the present invention it is possible to detect a deterioration or abnormality in the quality of an audio communication service, without sending out unnecessary signals or packets to a network that is in service. Furthermore, according to the present invention, it is possible to detect deterioration in quality and an occurrence of a silence or fragmented communication due to bit error.

PREFERRED MODES

First, a description is given of a summary of an exemplary embodiment of the present invention. An audio quality analyzing device of the exemplary embodiment of the present invention picks up a packet containing a bit stream obtained by compression encoding of audio sent by a certain terminal that performs audio communication (refer to FIG. 1). In addition to analyzing a header of the packet, the audio quality analyzing device performs at least one of: an analysis of a payload header and an analysis of the bit stream contained in the payload. The audio quality analyzing device of the exemplary embodiment of the present invention detects deterioration in the quality of the audio communication service by the analysis, and notifies a result of the detection to an upper level device.

According to the above description, it is possible to detect audio quality deterioration due to an occurrence of bit error or a silence or fragmented communication due to a device abnormality or the like, without the need to pass a test audio signal through a network in service and without embedding a test audio signal in a specific field of an audio packet.

First Exemplary Embodiment

Figure 1:
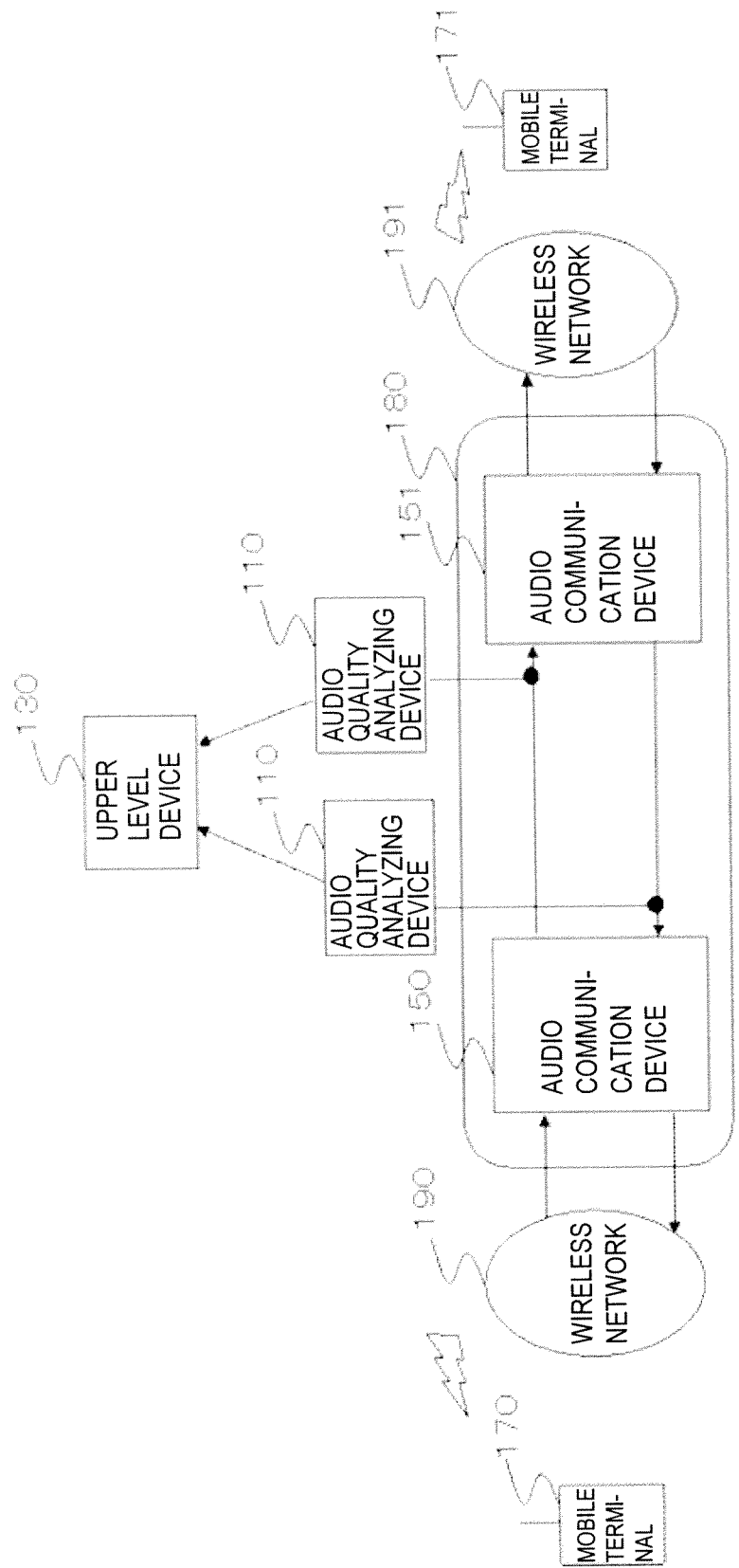
FIG. 1 is a diagram representing a configuration of a first exemplary embodiment of the present invention.

Next, a detailed description of the present invention is given with regard to a first exemplary embodiment, in which audio quality analysis is performed for an audio communication service in a mobile network, making reference to the drawings. FIG. 1 is a diagram representing a configuration of the first exemplary embodiment of the present invention.

FIG. 1 shows a mobile terminal 170 and a mobile terminal 171 performing audio communication (voice telephone call) via a wireless network 190, a mobile core network 180, and a wireless network 191.

The mobile core network 180 is assumed to be a CSIP network (Circuit Switched over IP Network). That is, an audio signal in circuit switching is converted into an IP packet by oppositely disposed audio communication devices 150 and 151, and forwarded to the mobile core network 180.

The mobile terminal 170 (171) is provided with a function that converts received audio to a bit stream that is compression encoded by a prescribed audio compression encoding method, and outputs the bit stream. Here, the audio compression encoding method is one that uses an AMR (Adaptive Multi-Rate speech codec) of 12.2 kbps. Since details of AMR can be obtained by referring, for example, to the 3GPP TS26.090 standard, a detailed description thereof is omitted here.

In the present exemplary embodiment, an AMR bit stream, when sent via the wireless network 190 to the mobile core network 180 from the wireless network 190, is contained in an Iu UP (Iu User Plane) protocol frame. The Iu UP protocol frame reaches the mobile core network 180 and is received by an audio communication device 150. Details of the Iu UP protocol frame here can be obtained by referring to the 3GPP TS26.102 standard.

Here the mobile terminal 170 and the mobile terminal 171 are assumed to communicate by TrFO (Transcoder Free Operation) bypassing audio codec. Therefore, the audio communication device 150, with the Iu UP protocol frame contained in a payload of an RTP (Real-time Transport Protocol) packet, uses an RTP/UDP (User Diagram Protocol)/IP protocol to send the RTP packet to the audio communication device 151 on a partner terminal side. Furthermore, the audio communication device 150 sends an RTCP (Real-time Transport Control Protocol) packet to the audio communication device 151 at fixed time intervals (for example, 5 seconds.)

The audio communication device 151 receives the RTP packet, retrieves the Iu UP protocol frame contained in the RTP payload portion, and sends to the wireless network 191. In the wireless network 191, the 12.2 kbps AMR bit stream contained in the Iu UP protocol frame is retrieved and sent to the mobile terminal 171.

The mobile terminal 171 receives the 12.2 kbps AMR bit stream, decodes the bit stream and reproduces the audio.

Audio communication from the mobile terminal 171 to the mobile terminal 170 is just a reverse flow of that described above, and since it is similar, a description thereof is omitted.

An audio quality analyzing device 110 picks up upward and downward RTP packets for N channels (N≥1) and upward and downward RTCP packets for N channels, exchanged between the audio communication device 150 and the audio communication device 151. It is to be noted that the example of FIG. 1 has a configuration where separate audio quality analyzing devices handle upward and downward directions, but it is possible to have a configuration where the same audio quality analyzing device handles both upward and downward directions.

The audio quality analyzing device 110 performs analysis of the picked-up RTP packets and the RTCP packets. An upper level device 130 is a device that receives a report on deterioration and the like of audio communication service quality from the audio quality analyzing device 110.

Figure 2:
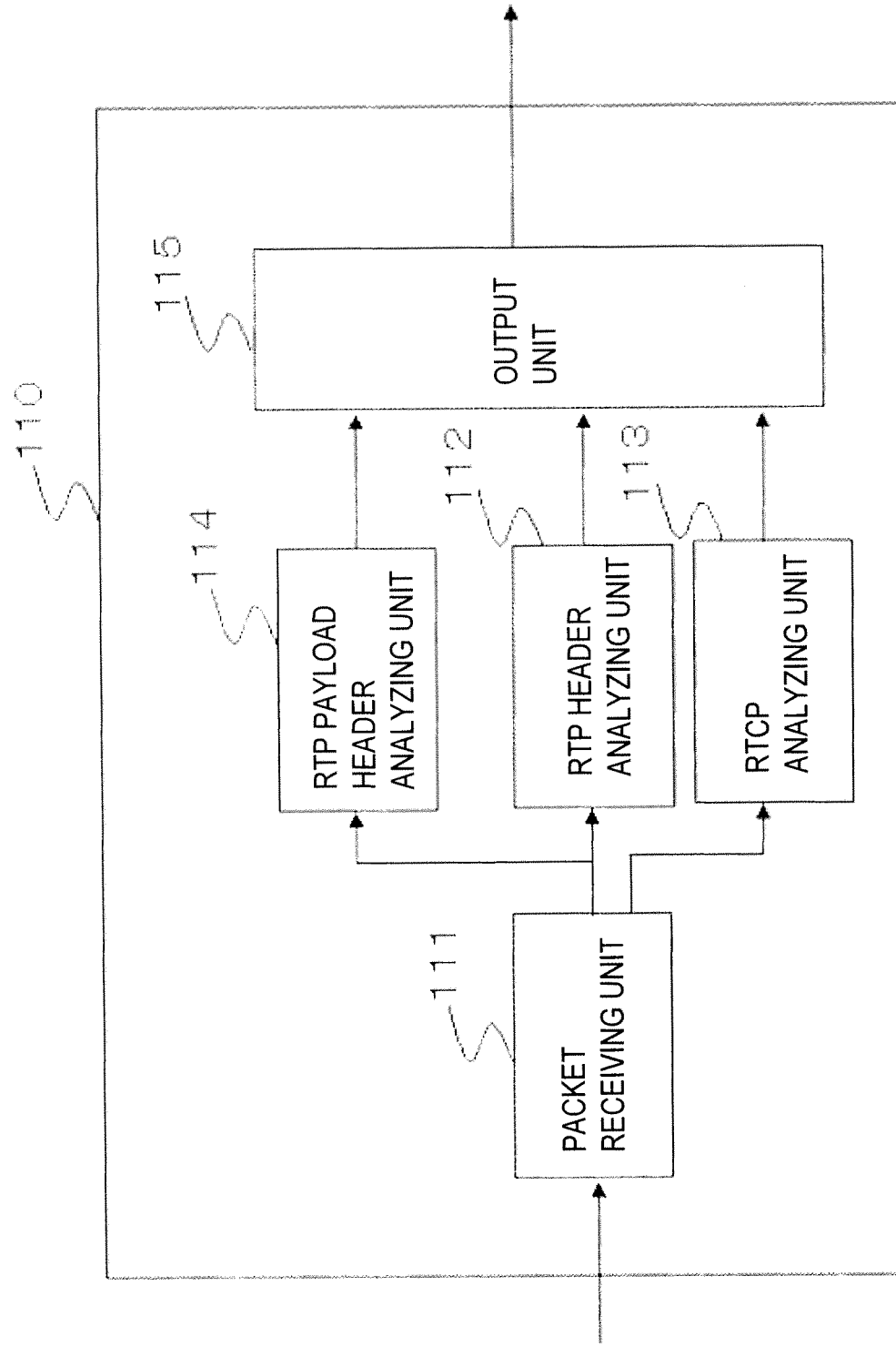
FIG. 2 is a diagram representing a detailed configuration of an audio analyzing device of the first exemplary embodiment of the present invention.

FIG. 2 is a block diagram showing a detailed configuration of the audio quality analyzing device of the first exemplary embodiment of the present invention. FIG. 2 shows a configuration provided with a packet receiving unit 111, an RTP header analyzing unit 112 that receives packets outputted by the packet receiving unit 111, an RTCP analyzing unit 113, an RTP payload header analyzing unit 114, and an output unit 115 that receives an analysis result from these respective analyzing units. It is to be noted that these respective units of the audio quality analyzing device can be realized not only by hardware but also by a program that executes processing to be described later in a computer configuring the audio quality analyzing device.

The packet receiving unit 111 picks up the RTP packet containing the AMR Iu UP protocol frame, and outputs to the RTP header analyzing unit 112 and the RTP payload header analyzing unit 114. Furthermore, the packet receiving unit 111 receives the RTCP packet once each fixed time period, and outputs to the RTCP analyzing unit 113.

(RTP Header Analysis)

The RTP header analyzing unit 112 performs packet loss analysis, as header analysis, and outputs a result thereof to the output unit 115. Here, in packet loss analysis, for a predetermined observation period (for example, 1 minute), continuity of RTP header sequence numbers is checked, and in a case where continuity is lacking, a determination is made that there is packet loss, and computation is performed of an interval in which the packet loss is continuous and of the packet loss rate in the overall observation period.

(RTCP Analysis)

The RTCP analyzing unit 113 performs at least one analysis among analyses described as follows.

(1) Analysis of delay time: the RTCP analyzing unit 113 computes round trip delay D by the following expression, using the time (NTP time stamp display) at which an RTCP packet is received, and LSR and DLSR contained in an RR (Receiver Report) within the RTCP.

$$D = \text{RTCP packet reception time} - DLSR - LSR \quad (1)$$

The RTCP analyzing unit 113 outputs a value of the round trip delay D in an observation period (for example, 1 minute) or time variation of the value of the round trip delay D, to the output unit 115. In addition, in a case where the value of the round trip delay D is larger than a predetermined threshold, the RTCP analyzing unit 113 outputs warning information (alarm) to the output unit 115.

(2) Analysis of jitter amount: the RTCP analyzing unit 113 copies the jitter amount contained in the RTCP RR and outputs the value of the jitter amount and the time variation of the jitter amount to the output unit 115. In addition, in a case where the value of the jitter is larger than a predetermined threshold, the RTCP analyzing unit 113 outputs warning information to the output unit 115.

(RTP Payload Header Analysis)

The RTP payload header analyzing unit 114 analyzes audio quality deterioration due to the generation of bit error. Specifically, the RTP payload header analyzing unit 114 checks the value of an FQC (Frame Quality Classifier) field of a payload header part, with respect to the Iu UP (In User Plane) protocol frame contained in the payload part of the RTP packet, and computes the number of times there is a value outside of 0 (Good) in the observation period and the continuation time. The RTP payload header analyzing unit 114 outputs these numerical values to the output unit 115. In addition, in a case where at least one of the number of times and the continuation time exceed a predetermined threshold, the RTP payload header analyzing unit 114 determines that there is quality deterioration and outputs warning information to the output unit 115.

The output unit 115 outputs an analysis result outputted by the abovementioned respective analyzing units, time variation of the numerical values, and warning information, in an observation period, to the upper level device 130 once in each observation period.

As described above, according to the first exemplary embodiment of the present invention, it is possible to detect an abnormality or the state of an FQC value of a payload header, in addition to packet loss state, round trip delay state, and jitter state, and report to the upper level device 130, without the need to pass a test audio signal through a network in service and without embedding a test audio signal in a specific field of an audio packet.

Second Exemplary Embodiment

Figure 3:
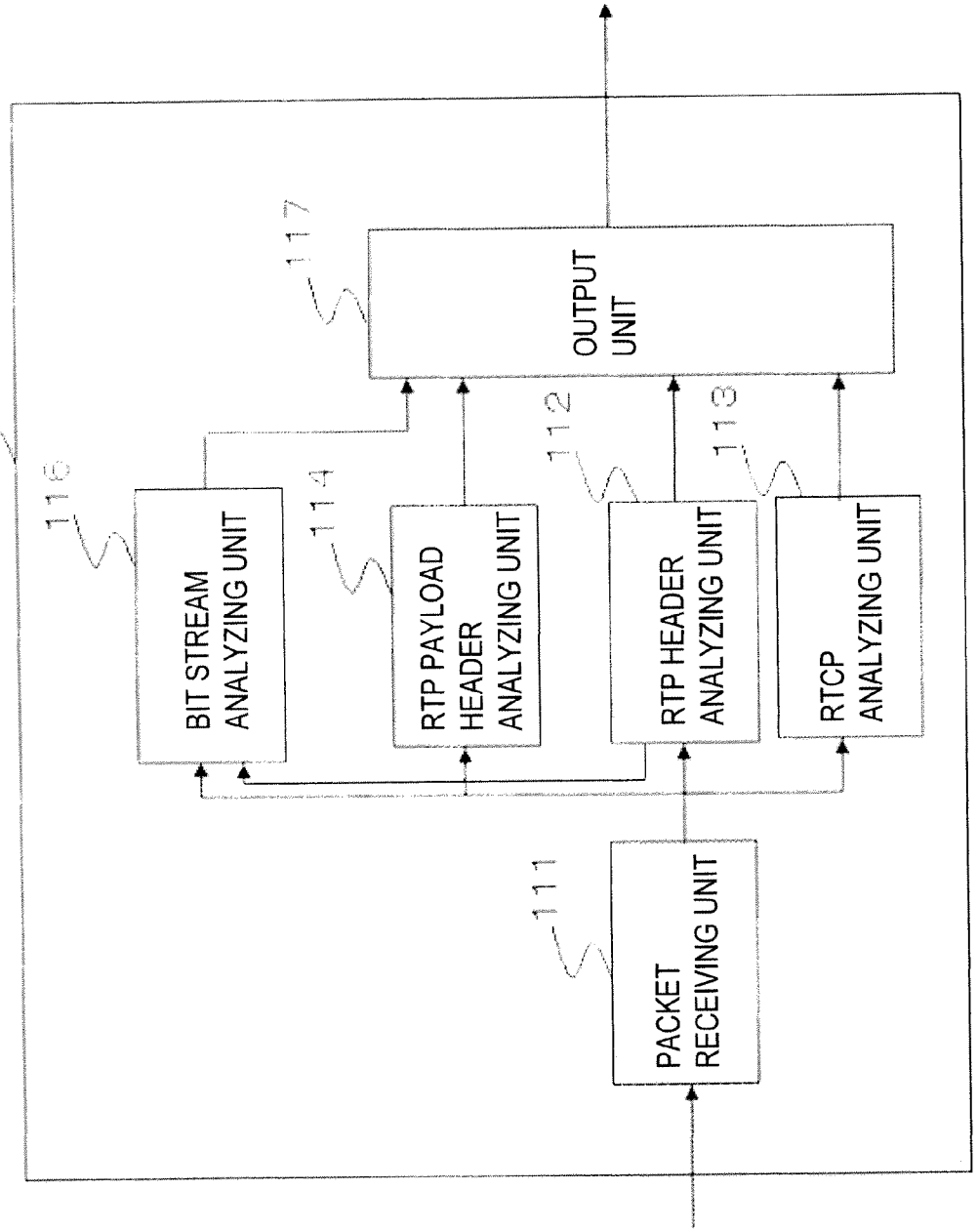
FIG. 3 is a diagram representing a detailed configuration of an audio analyzing device of a second exemplary embodiment of the present invention.

Next a detailed description is given concerning a second exemplary embodiment of the present invention in which bit stream analysis is implemented, making reference to the drawings. FIG. 3 is a block diagram showing a detailed configuration of an audio quality analyzing device of the second exemplary embodiment. In FIG. 3, since component elements given the same numbers as FIG. 2 are equivalent to component elements of the first exemplary embodiment, a description thereof is omitted, and points of difference are described below.

Referring to FIG. 3, the audio quality analyzing device of the second exemplary embodiment, in addition to the configuration of the audio quality analyzing device of the first exemplary embodiment (refer to FIG. 2), is provided with a bit stream analyzing unit 116 that receives a packet outputted from a packet receiving unit 111, and is configured such that an analysis result outputted from a bit stream analyzing unit 116 is inputted to an output unit 117.

The bit stream analyzing unit 116 is added in order to analyze a bit stream in a case of receiving an RTP packet, and to detect an occurrence of a silence event due to an abnormality of a communication device or the like. A detailed description is given below concerning a method of detecting the silence event.

Detection of a silence event: in a case where any of the following (no receipt of RTP packet/level estimation value=0) is detected within an observation period, a determination of a silence, due to an abnormality of a router, communication device or the like, is made.

First, in a case where absolutely no RTP packet is received during the observation period and sequence number is not counted up, an RTP header analyzing unit 112 determines that there is a silence due to a packet not being forwarded due to an abnormality in a router or the like, disposed in a mobile core network 180, and outputs warning information to the output unit 117.

In a case where an RTP packet is received during the observation period, the RTP header analyzing unit 112 gives notification of receipt of the RTP packet to the bit stream analyzing unit 116. The bit stream analyzing unit 116 that has received the notification performs an analysis.

Figure 4:
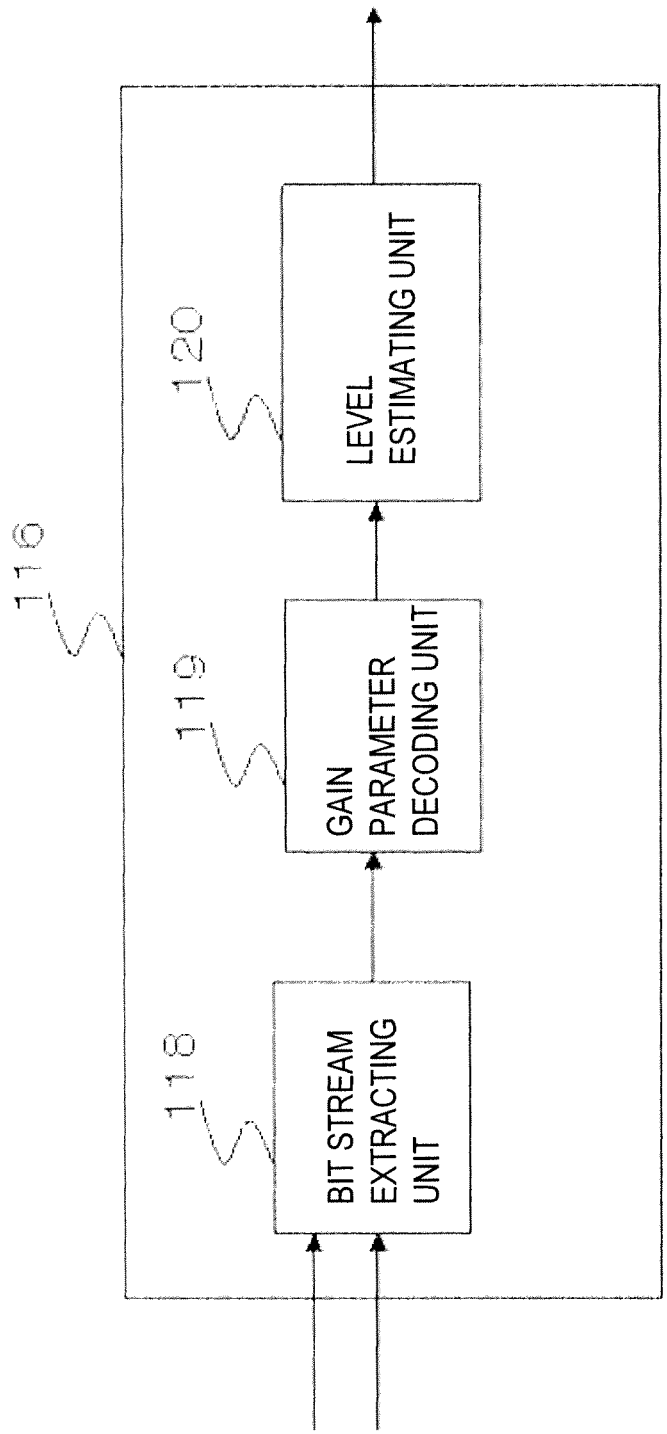
FIG. 4 is a diagram representing a detailed configuration of a bit stream analyzer of FIG. 3.

FIG. 4 shows a configuration example of the bit stream analyzing unit 116. Referring to FIG. 4, the configuration is shown to be provided with a bit stream extracting unit 118, a gain parameter decoding unit 119, and a level estimating unit 120.

On being notified from the RTP header analyzing unit 112 that an RTP packet has been received, the bit stream extracting unit 118 retrieves an Iu UP protocol frame from a payload unit, with respect to the received RTP packet, and furthermore extracts an AMR bit stream contained in the Iu UP protocol frame.

Here, in a case where AMR is in silence compression mode, the gain parameter decoding unit 119 decodes a gain parameter by a SID (Silence Insertion Descriptor) frame, and outputs a decoding result to the level estimating unit 120. With the inputted decoding result as a level estimation value, the level estimating unit 120 determines that the result is normal if the level estimation value is not zero, and outputs the result (normal) to the output unit 117. On the other hand, in a case where the level estimation value is zero, the level estimating unit 120 determines that there is a silence due to an abnormality of a router or communication device, and outputs warning information, including the number of times the SID frame level within the observation period is zero, to the output unit 117.

On the other hand, in a case where AMR is not in silence compression mode, the gain parameter decoding unit 119 decodes a gain parameter related to fixed codebook, among the AMR bit stream, and outputs a decoding result to the level estimating unit 120. The level estimating unit 120 performs processing to add a gain parameter predicted value with regard to the fixed codebook, and with this as a level estimation value, determines that the result is normal if the level estimation value is not zero, and outputs the result (normal) to the output unit 117. On the other hand, in a case where the level estimation value is zero, a determination is made that there is a silence due to an abnormality of a router or communication device, and warning information, including the number of times the level estimation value is zero within the observation period and the duration time thereof, is outputted to the output unit 117.

As described above, according to the second exemplary embodiment of the present invention, in addition to an effect of the first exemplary embodiment described above, it is possible to detect a silence event due to an abnormality in a router, a communication device, or the like, and to report to the upper level device 130.

It is to be noted that it is possible to use another audio codec outside of AMR, for example, ITU-T Recommendation G.729, as used VoIP, as the audio compression encoding method. In the case of G.729, the Iu UP protocol is not used, and a number (specifically, 18) is used that shows that a payload type field of an RTP header is G.729.

Furthermore, the hit stream analyzing unit 116 of the second exemplary embodiment described above can also be configured as described below.

Figure 5:
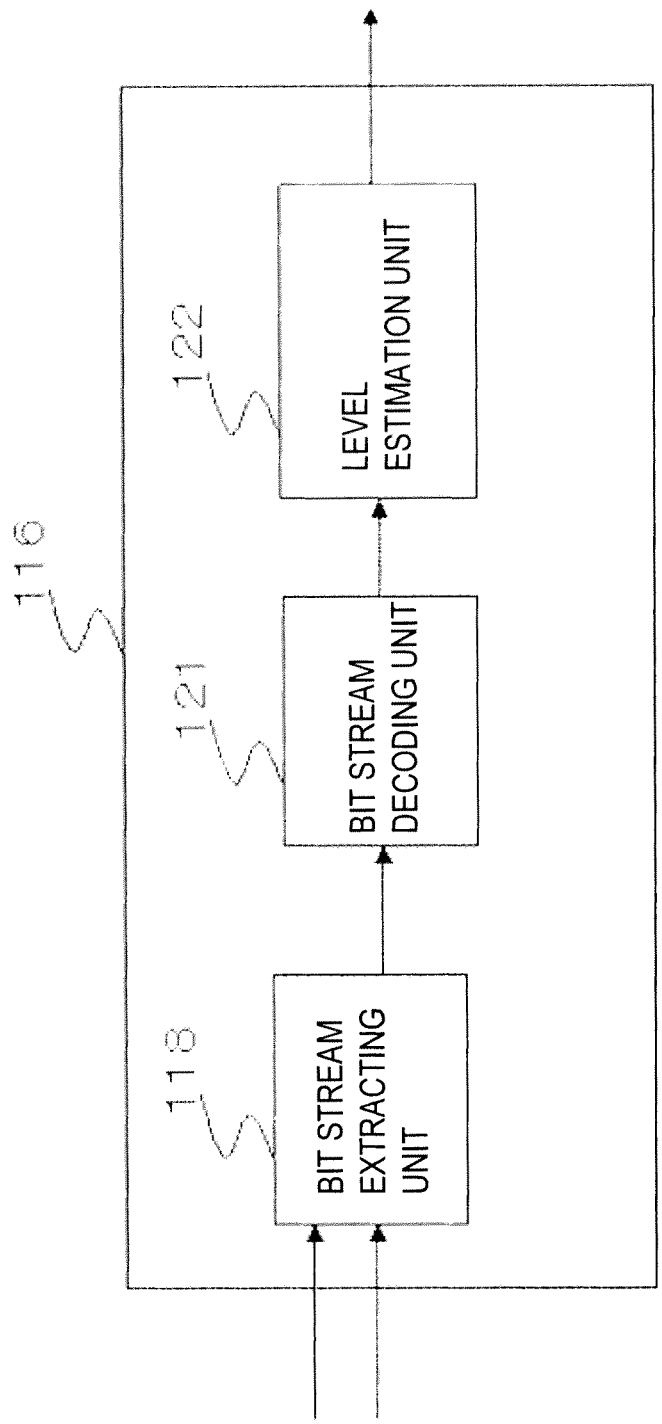
FIG. 5 is a diagram representing a modified exemplary embodiment of the bit stream analyzer of FIG. 3.

FIG. 5 is a block diagram showing a configuration of a modified exemplary embodiment of the hit stream analyzing unit 116. The configuration of FIG. 5 shows a case where the audio compression encoding method is according to ITU-T Recommendation G.711. In the case of G.711, similar to G.729 described above, the Iu UP protocol is not used, and a number (specifically, 0) is used that shows that the payload type field of the RTP header is G.711.

In FIG. 5, since component elements given the same numbers as FIG. 4 are equivalent to the second exemplary embodiment, a description thereof is omitted, and points of difference are described below. The bit stream decoding unit 121 delimits a G.711 bit stream into predetermined frame intervals (for example, 10 ms or 20 ms), decodes the entire bit stream included in the frame intervals, and outputs a signal S(n) obtained by decoding, to the level estimating unit 122.

The level estimating unit 122 computes a level estimation value L by frame intervals, based on the following expression (1).

$$L = \sqrt{\frac{1}{N} \sum S(n) * S(n)} \quad (1)$$

In (1) described above, N indicates the number of samples of signal included in a frame interval. For example, in a case of a 20 ms interval, N=160. In a case where the level estimation value L is zero, the level estimating unit 122 determines that there is a silence due to an abnormality of a router or a communication device, and outputs warning information including the number of times the level estimation value L is zero within the observation period and the continuous time thereof, to the output unit 117.

As described above, it is possible to perform detection of a silence event even with an audio compression encoding method outside of AMR, for example, G.729, G.711, or the like.

Third Exemplary Embodiment

Next, a detailed description is given concerning a third exemplary embodiment of the present invention in which a second audio quality analyzing unit is added, making reference to the drawings.

Figure 6:
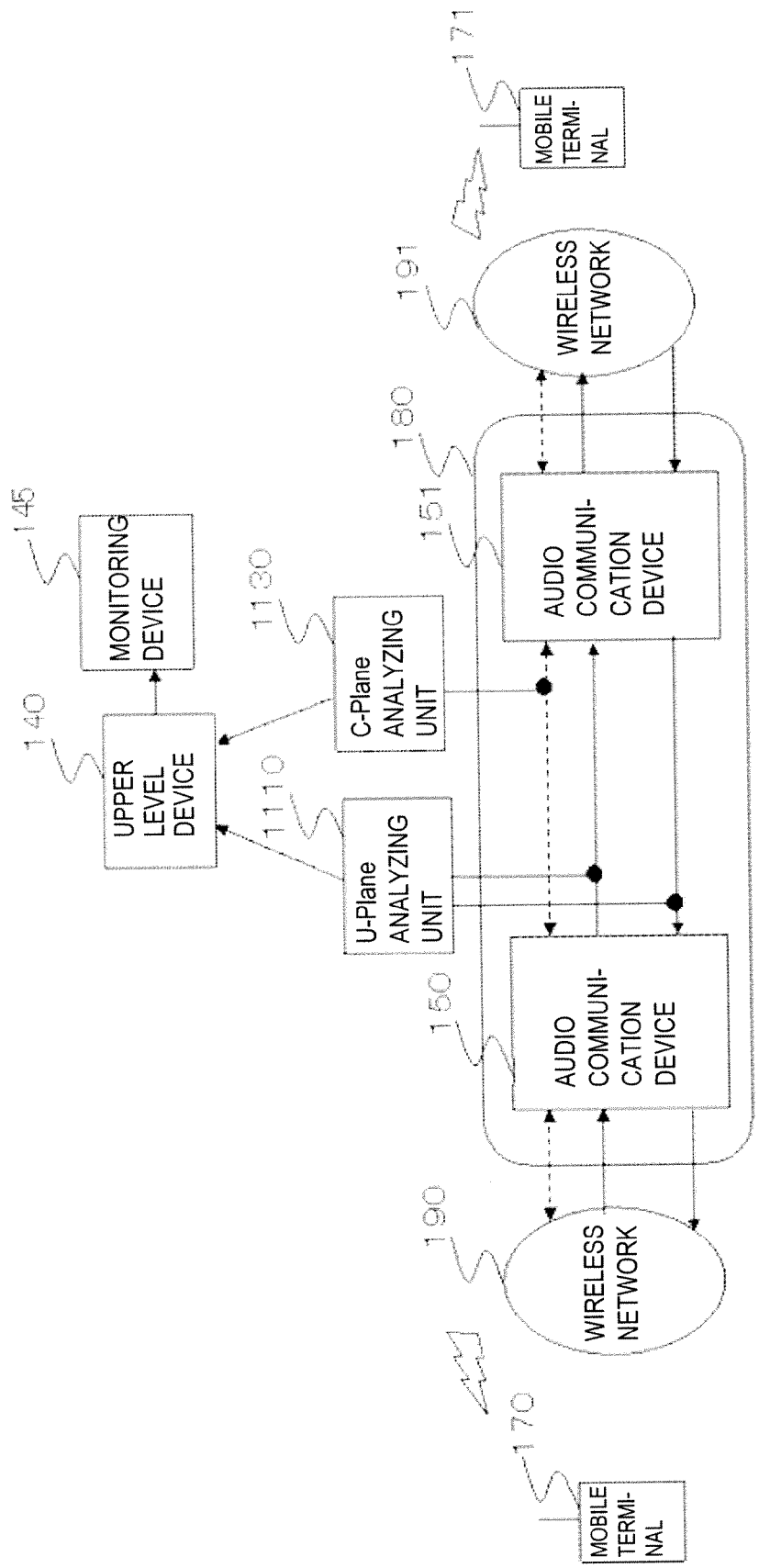
FIG. 6 is a diagram representing a configuration of a third exemplary embodiment of the present invention.

First, a description is given of a summary of the present exemplary embodiment. As shown in FIG. 6, an audio quality analyzing device of the present invention can be realized by: a first audio quality analyzing unit (refer to "U-Plane analyzing device" of FIG. 6) that picks up from a network a first packet containing a bit stream obtained by compression encoding of audio sent by a certain terminal that performs audio communication, and in addition to analyzing a header of the first packet, detects deterioration of audio communication service quality by performing at least one of: an analysis of a payload header and an analysis of the bit stream contained in the payload; a second audio quality analyzing unit (refer to "C-Plane analyzing device" of FIG. 6) that picks up from a network a second packet containing a control signal and analyzes the second packet; and an upper level device (refer to "upper level device" of FIG. 6) that receives an analysis result outputted from the first and second audio quality analyzing units.

The upper level device confirms whether or not deterioration in audio communication service quality detected by the first audio quality analyzing unit is consistent with an analysis result of the second audio quality analyzing unit.

According to the above, it is possible to perform analysis and detection of audio quality deterioration due to an occurrence of bit error or of silence or fragmented communication due to an abnormality of a device, without the necessity to pass a test audio signal through a network in service and without embedding a test audio signal in a specific field of an audio packet. Furthermore, according to the abovementioned configuration, since the arrangement confirms and verifies that a relevant channel, which performs not only analysis of a user plane (U-Plane) packet but also analysis of a control signal of a control plane (C-Plane), is busy, it is possible to detect a silence due to an abnormality with good accuracy. It is to be noted that the first and second audio quality analyzing units can be provided in an embodiment independent of the upper level device, as in FIG. 6, but it is also possible to have an embodiment where they are built into the upper level device. Furthermore, it is also possible to employ a configuration where a notification of deterioration of audio communication service quality from the first audio quality analyzing unit is received and verified by the second audio quality analyzing unit, and an analysis result from the second audio quality analyzing unit is received and verified by the first audio quality analyzing unit.

FIG. 6 is a diagram representing a configuration of the third exemplary embodiment of the present invention. FIG. 6 shows a mobile terminal 170 and a mobile terminal 171 performing audio communication (voice telephone call) via a wireless network 190, a mobile core network 180, and a wireless network 191.

The mobile core network 180 is assumed to be a CSIP network (Circuit Switched over IP Network.) That is, an audio signal in circuit switching is converted into an IP packet by oppositely disposed audio communication devices 150 and 151, and forwarded to the mobile core network 180.

The mobile terminal 170 (171) is provided with a function that converts received audio to a bit stream that is compression encoded by a prescribed audio compression encoding method, and outputs the bit stream. Here, the audio compression encoding method is one that uses an AMR (Adaptive Multi-Rate speech codec) of 12.2 kbps. Since details of AMR can be obtained by referring, for example, to the 3GPP TS26.090 standard, a detailed description thereof is omitted here.

When transmitted to the mobile core network 180 from the wireless network 190, via the wireless network 190, the abovementioned AMR bit stream is contained in an Iu UP (Iu User Plane) protocol frame. The Iu UP protocol frame reaches the mobile core network 180 and is received by the audio communication device 150. Details of the Iu UP protocol frame here can be obtained by referring to the 3GPP TS26.102 standard.

In the present exemplary embodiment, a certain U-Plane packet, which is a first packet that contains a bit stream obtained by compression-encoding the audio, between the audio communication device 150 and the audio communication device 151, is forwarded using an RTP/UDP/IP protocol. In the same way, a second packet containing a control signal is forwarded by a UDP/IP protocol. Below, in the present exemplary embodiment a description is given in which call control is performed using SIP (Session Initiation Protocol) but other call control methods are also possible.

Here, audio communication between the mobile terminal 170 and the mobile terminal 171 is assumed to be communication by TrFO (Transcoder Free Operation) bypassing an audio codec. Therefore, the audio communication device 150, with the Iu UP protocol frame being contained in a payload part of an RTP (Real-time Transport Protocol) packet, uses an RTP/UDP/IP protocol to send an RTP packet to an audio communication device 151 on a partner terminal side. Furthermore, the audio communication device 150 sends an RTCP (Real-time Transport Control Protocol) packet to the audio communication device 151 at fixed time intervals (for example, 5 seconds.)

The audio communication device 151 receives a UDP packet containing a control signal as described above, performs call connection processing by retrieving a control signal, and furthermore converts to a call control signal (for example, ISUP (ISDN User Part)) in circuit switching, and outputs to the wireless network 191. Furthermore, the audio communication device 151 receives the RTP packet, retrieves the Iu UP protocol frame contained in the RTP payload portion, and sends to the wireless network 191. In the wireless network 191, the 12.2 kbps AMR bit stream contained in the Iu UP protocol frame is retrieved and sent to the mobile terminal 171.

The mobile terminal 171 receives the 12.2 kbps AMR bit stream, decodes the bit stream, and reproduces the audio. Audio communication from the mobile terminal 171 to the mobile terminal 170 is just a reverse flow of that described above, and since it is similar, a description thereof is omitted.

A U-Plane analyzing device 1110 picks up upward and downward RTP packets (first packets) for N channels (N≥1) and upward and downward RTCP packets for N channels, exchanged between the audio communication device 150 and the audio communication device 151. It is to be noted that the example of FIG. 1 has a configuration where the same U-Plane analyzing device 1110 handles analysis in upward and downward directions, but it is possible to have a configuration using different U-Plane analyzing devices for upward and downward directions.

The U-Plane analyzing device 1110 corresponds to the audio quality analyzing unit of the first exemplary embodiment and performs analysis of the picked-up RTP packet (first packet) and the RTCP packet.

A C-Plane analyzing device 1130 corresponds to the abovementioned second audio quality analyzing unit, and picks up a UDP packet, which is a second packet that stores a control signal exchanged between the audio communication devices 150 and 151, and performs this analysis. For example, in a case of performing call control using SIP, among call control exchanges by SIP, a session establishing method "Invite" is sent from the audio communication device 150, and a response "200 OK" arrives from the audio communication device 151. The C-Plane analyzing device 130 determines that a session in question, at a point in time when the response "200 OK" is received, is an audio communication start, and gives notification of the session number, receiving IP address, source IP address, receiving port number, and the like, to an upper level device 140. Furthermore, the C-Plane analyzing device 1130 determines a communication end and gives notification to the upper level device 140, at a point in time when a session completion method "BYE" transmitted from the audio communication device 150 or the audio communication device 151 is picked up.

Next, a description is given concerning a detailed configuration of the U-Plane analyzing device 1110 that performs detection of abnormalities of service quality by a first packet that has been picked up.

Figure 7:
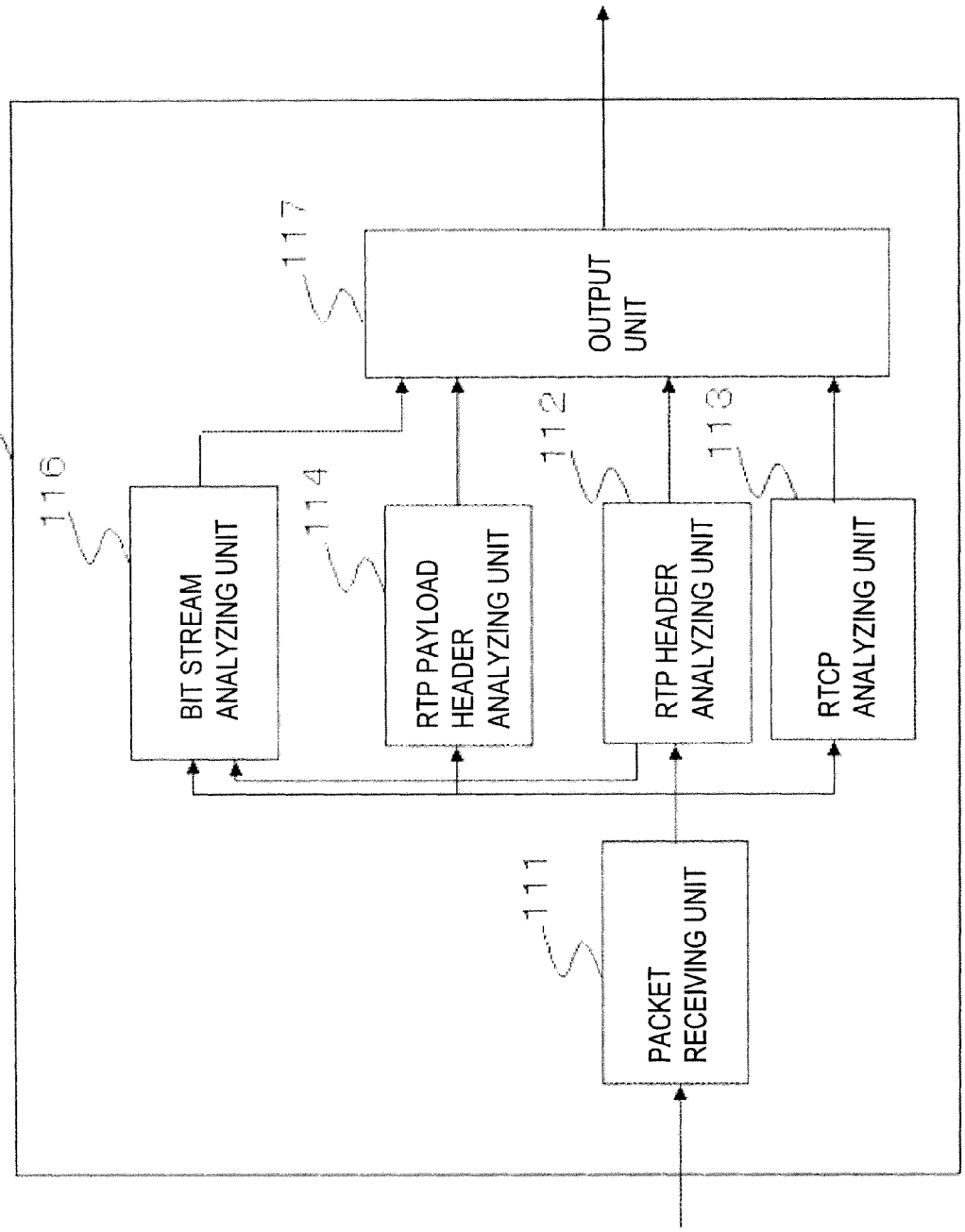
FIG. 7 is a diagram representing a detailed configuration of an audio analyzing device of the third exemplary embodiment of the present invention.

FIG. 7 is a block diagram showing a detailed configuration of the U-Plane analyzing device of the first exemplary embodiment of the present invention. FIG. 7 shows a configuration provided with a packet receiving unit 111, an RTP header analyzing unit 112 that receives a packet outputted by the packet receiving unit 111, an RTCP analyzing unit 113, an RTP payload header analyzing unit 114, a bit stream analyzing unit 116, and an output unit 117 that receives an analysis result from these respective analyzing units. It is to be noted that since these respective units of the U-Plane analyzing device are equivalent to respective units of the audio analyzing device of the first exemplary embodiment described above, a description thereof is omitted. Furthermore, the respective units of the U-Plane analyzing device can also be realized not only by hardware, but also by a program that executes processing described later on a computer forming an upper level device including the U-Plane analyzing device, or the U-Plane analyzing device and the C-Plane analyzing device.

In the above configuration, a state of occurrence of packet loss, delay time, jitter amount, bit error, or a silence event is detected, and an analysis result (call state) based on a control signal is outputted.

Referring to FIG. 6, the upper level device 140 makes a determination of an occurrence of an abnormality in service quality based on content notified from the U-Plane analyzing device 1110 and the C-Plane analyzing device 1130, as described above. For example, in a certain session, irrespective of receiving a notification of being busy from the C-Plane analyzing device 1130, in a case of receiving a notification that there is a possibility of a silence due to an abnormality from the U-Plane analyzing device 1110, the upper level device 140 determines that a silence event is occurring due to an abnormality in the session in question, and gives notification of an alarm to a monitoring device 145.

The monitoring device 145 of FIG. 6, on receiving the alarm from the upper level device 140, outputs a message to the effect that a silence is occurring due to an abnormality in the session in question, to a prescribed display device or the like.

As described above, according to the third exemplary embodiment of the present invention, it is possible to detect a packet loss state, a round trip delay state, a jitter state, a state of an FQC value of a payload header, or an occurrence of a silence event, without the need to pass a test audio signal through a network in service and without embedding a test audio signal in a specific field of an audio packet, and after verifying this using a control signal, it is possible to output to the monitoring device 145.

Fourth Exemplary Embodiment

Next, a description is given concerning a fourth exemplary embodiment of the present invention, giving consideration to problems of the audio quality analyzing device described in the abovementioned Patent Documents 5 to 7.

Since the audio quality analyzing device described in the abovementioned Patent Documents 5 to 7 must pass a test audio signal for analysis through a network and pick up a signal that is returned via the network to compare with the original signal, or must embed a test audio signal in a specific field within an audio packet to be sent from a transmission side device, and after reception thereof at a reception side device, extract the test audio signal to compare with the original test audio signal, there is a problem in that an unnecessary signal is passed through the network during service operation.

Furthermore, since, in order to reduce processing amount the abovementioned audio quality analyzing device has a configuration to perform analysis of only a packet header or only RTCP analysis, there is problem in that it is only possible to analyze for an occurrence of packet loss, or packet loss rate, jitter, round trip delay or one-way delay. Therefore, in a case of analysis outside of these, for example, where a gateway mutually connecting a PSTN network (public exchange telephone network) and an IP network is present within a network, there is a problem in that it is not possible to detect audio deterioration due to a residual echo signal.

Therefore, in the present exemplary embodiment it is possible to detect audio quality deterioration due to a residual echo signal, without the necessity to pass a test audio signal through a network during service or to embed a test audio signal in a specific field of an audio packet, as in the abovementioned audio quality analyzing devices.

First, a description is given of a summary of the present exemplary embodiment. The audio quality analyzing device of the present exemplary embodiment picks up respective upward and downward packets containing bit streams obtained by compression encoding of audio sent by respective terminals that perform audio communication (refer to FIG. 8). The audio quality analyzing device decodes respective spectral parameters in a bit stream contained in payloads of the respective packets, and by using the upward and downward decoding results to obtain a correlation between an upward spectrum and a downward spectrum, detects whether or not there is residual echo, and gives notification of a detection result to an upper level device.

From the above, it is possible to detect a residual echo signal, without the necessity to pass a test audio signal through a network in service or without embedding a test audio signal in a specific field of an audio packet.

Figure 8:
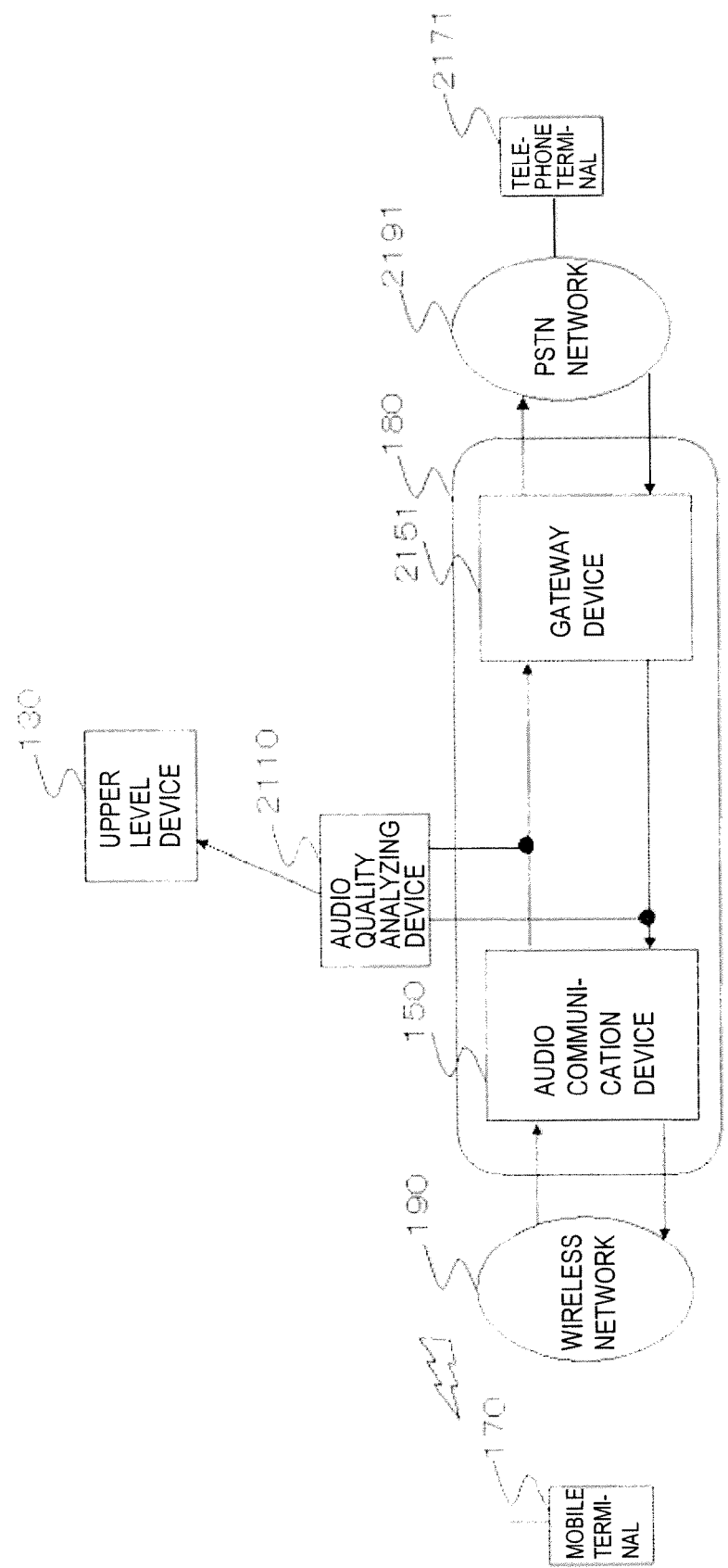
FIG. 8 is a diagram representing a configuration of a fourth exemplary embodiment of the present invention.

Next, a detailed description of the present invention is given with regard to the fourth exemplary embodiment in which audio quality analysis is performed for an audio communication service between a mobile network and a PSTN network 2191, making reference to the drawings. FIG. 8 is a diagram representing a configuration of the fourth exemplary embodiment of the present invention.

FIG. 8 shows a mobile terminal 170 and a telephone terminal 2171 performing audio communication (voice telephone call) via a wireless network 190, a mobile core network 180, and a PSTN network 2191.

The mobile core network 180 is assumed to be a CS IP network (Circuit Switched over –IP Network.) That is, an audio signal in circuit switching is converted into an IP packet by an audio communication device 150 and a gateway device 2151, which are oppositely disposed, to be forwarded to the mobile core network 180.

The mobile terminal 170 is provided with a function that converts received audio to a bit stream that is compression encoded by a prescribed audio compression encoding method, and outputs the bit stream in question. Here, the audio compression encoding method is one that uses an AMR (Adaptive Multi-Rate speech codec) of 12.2 kbps. Since details of AMR can be obtained by referring, for example, to the 3GPP TS26.090 standard, a detailed description thereof is omitted here.

When transmitted to the mobile core network 180 from the wireless network 190, via the wireless network 190, the abovementioned AMR bit stream is contained in an Iu UP (Iu User Plane) protocol frame. The Iu UP protocol frame reaches the mobile core network 180 and is received by the audio communication device 150. Details of the Iu UP protocol frame here can be obtained by referring to the 3GPP TS26.102 standard.

The audio communication device 150 extracts a bit stream and header information related to the 12.2 kbps AMR from within the Iu UP protocol frame, to be contained in a payload part of an RTP (Real-time Transport Protocol) packet. Here, with regard to being contained in the RTP payload part, an RTP payload format specified by RFC 3267 for AMR is used (refer to 3GPP TS29.163.) Therefore, the audio communication device 150, by copying and moving necessary information from the Iu UP frame to the payload format according to RFC 3267, sends the RTP packet containing the 12.2 kbps AMR bit stream in a payload portion to the gateway device 2151, using an RTP/UDP/IP protocol. Furthermore, the audio communication device 150 sends an RTCP (Real-time Transport Control Protocol) packet to the gateway device 2151 at fixed time intervals (for example, 5 seconds.)

The gateway device 2151, on receiving the RTP packet and confirming the RTP payload format, converts the 12.2 kbps AMR stream contained in the payload portion to a G.711 stream, and outputs the converted G.711 stream to the PSTN network 2191 according to STM (Synchronous Transfer Mode.)

The telephone terminal 2171 receives an audio signal via the connected PSTN network 2191.

An audio communication from the telephone terminal 2171 towards the mobile terminal 170 is just a reverse flow of that described above, and since it is similar, a description thereof is omitted.

The audio quality analyzing device 2110 picks up upward and downward RTP packets for N channels (N≥1) and upward and downward RTCP packets for N channels, exchanged between the audio communication device 150 and the gateway device 2151.

The audio quality analyzing device 2110 performs analysis of the picked-up RTP packets and the RTCP packets.

Figure 9:
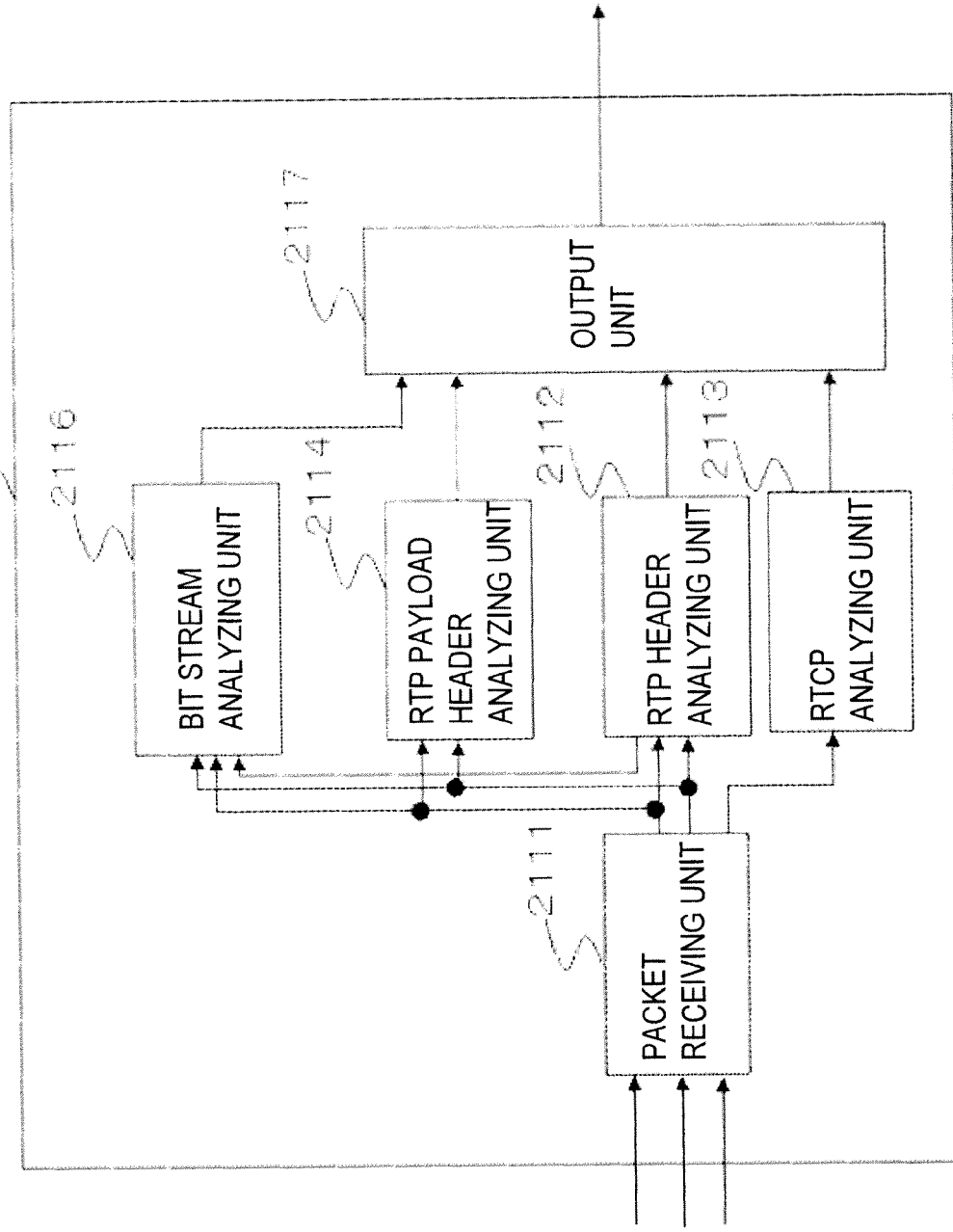
FIG. 9 is a diagram representing a detailed configuration of an audio analyzing device of the fourth exemplary embodiment of the present invention.

FIG. 9 is a block diagram showing a detailed configuration of the audio quality analyzing device of the fourth exemplary embodiment of the present invention. FIG. 9 shows a configuration provided with: a packet receiving unit 2111, an RTP header analyzing unit 2112 that receives a packet outputted by the packet receiving unit 2111, an RTCP analyzing unit 2113, an RTP payload header analyzing unit 2114, a bit stream analyzing unit 2116, and an output unit 2117 that receives an analysis result from these respective analyzing units. It is to be noted that these respective units of the audio quality analyzing device can be realized not only by hardware but also by a program that executes processing to be described later in a computer configuring the audio quality analyzing device.

The packet receiving unit 2111 picks up upward and downward RTP packets containing the RFC3267 payload format and 12.2 kbps AMR bit stream, and outputs to the RTP header analyzing unit 2112, the RTP payload header analyzing unit 2114, and the bit stream analyzing unit 2116. Furthermore, the packet receiving unit 2111 receives the RTCP packet once each fixed time period, and outputs to the RTCP analyzing unit 2113.

(RTP Header Analysis)

The RTP header analyzing unit 2112 performs packet loss analysis, as header analysis, and outputs a result thereof to the output unit 2117. Here, in packet loss analysis, for a predetermined observation period (for example, 1 minute), continuity of RTP header sequence numbers is checked, and in a case where continuity is lacking, a determination is made that there is packet loss, and computation is performed of an interval in which the packet loss is continuous and of the packet loss rate in the overall observation period.

(RTCP Analysis)

The RTCP analyzing unit 2113 performs at least one analysis among analyses described as follows.

(1) Analysis of delay time: round trip delay D is computed by the following expression (3), using the time (NTP time stamp display) at which an RTCP packet is received, and LSR and DLSR contained in an RR (Receiver Report) within the RTCP.

$$D = \text{RTCP packet reception time} - DLSR - LSR \quad (3)$$

The RTCP analyzing unit 2113 outputs a value of the round trip delay D in an observation period (for example, 1 minute) or time variation of the value of the round trip delay D, to the output unit 2117. In addition, in a case where the value of the round trip delay D is larger than a predetermined threshold, the RTCP analyzing unit 2113 outputs warning information (alarm) to the output unit 2117.

(2) Analysis of jitter amount: the RTCP analyzing unit 2113 copies the jitter amount contained in the RTCP RR and outputs the value of the jitter amount and the time variation of the jitter amount to the output unit 2117. In addition, in a case where the value of the jitter is larger than a predetermined threshold, the RTCP analyzing unit 2113 outputs warning information to the output unit 2117.

(RTP Payload Header Analysis)

The RTP payload header analyzing unit 2114 analyzes audio quality deterioration due to an occurrence of bit error. Specifically, the RTP payload header analyzing unit 2114 checks a value of a Q (Quality) field contained in the header part of the RFC 3267 payload format of the RTP packet and computes the number of times the value is not 1 (Good) during an observation period and the continuation time thereof. The RTP payload header analyzing unit 2114 outputs these numerical values to the output unit 2117. In addition, in a case where at least one of the number of times and the continuation time exceed a predetermined threshold, the RTP payload header analyzing unit 2114 determines that there is quality deterioration and outputs warning information to the output unit 2117.

(Bit Stream Analysis (Detection of Residual Echo))

Figure 10:
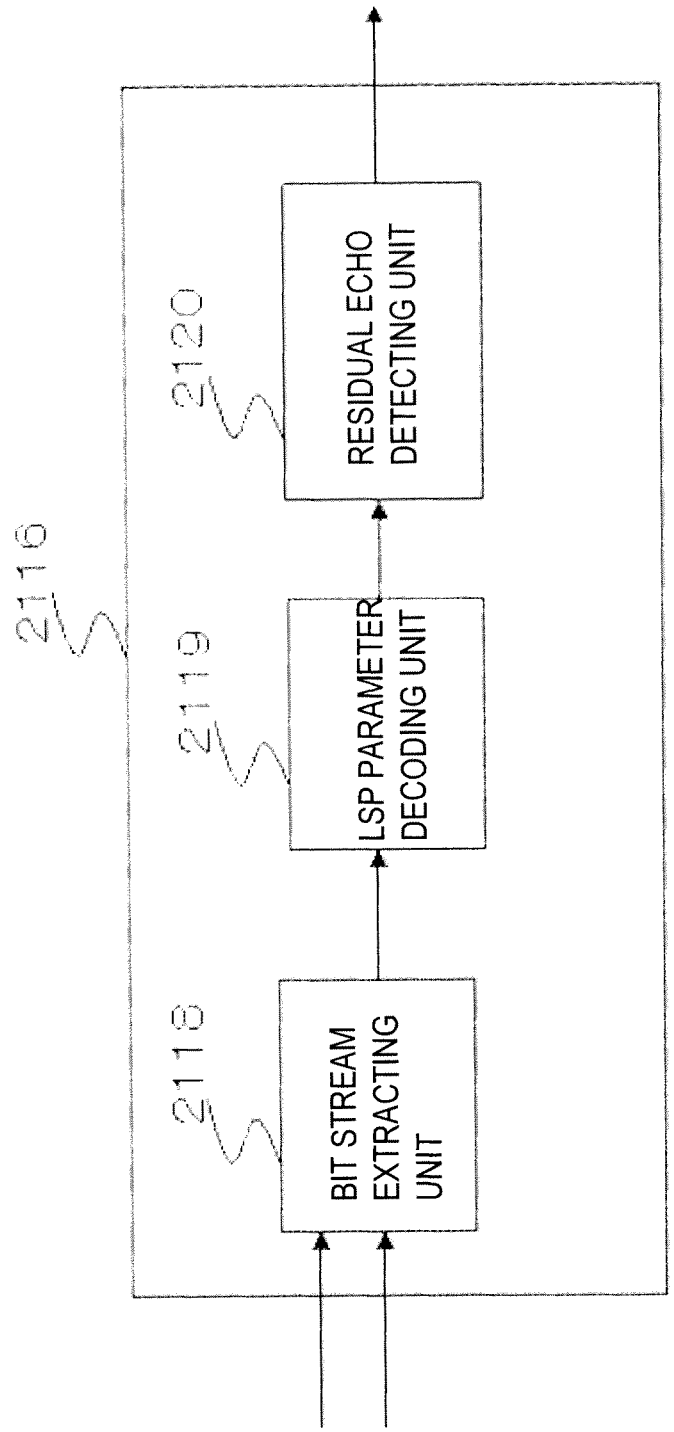
FIG. 10 is a diagram representing a detailed configuration of a bit stream analyzer of FIG. 9.

Next, a detailed description is given concerning a method of detecting residual echo. FIG. 10 shows a configuration example of the bit stream analyzing unit 2116. FIG. 10 shows the configuration which is provided with a hit stream extracting unit 2118, an LSP parameter decoding unit 2119, and a residual echo detecting unit 2120.

When notified that an RTP packet has been received from the RTP header analyzing unit 2112, the bit stream extracting unit 2118 receives upward and downward RTP packets, and extracts a 12.2 kbps AMR bit stream contained in the RFC 3267 payload format part, with respect to each thereof. Here, 38 bits representing the LSP (line spectral pair) parameters, among 244 bits of the AMR bit stream per frame are extracted and outputted.

The LSP parameter decoding unit 2119 decodes only the 38 bit portion (LSP parameters) for upward and downward directions, and outputs to the residual echo detecting unit 2120.

The residual echo detecting unit 2120 receives the decoded LSP parameters and converts to LPC (linear prediction coding) coefficients, and additionally converts to an LPC spectrum p(n) (n is greater than or equal to 1 and less than or equal to N), or an LPC Cepstrum c(n) (n is greater than or equal to 1 and less than or equal to M.)

A description is given below using the LPC spectrum p(n.) Here, an LPC spectrum computed from an upward LSP parameter is represented as Pf(n), and an LPC spectrum computed from a downward LSP parameter is represented as Pb(n.) (Note that n in each case is greater than or equal to 1 and less than or equal to N.)

The residual echo detecting unit 2120 additionally performs a computation as in the following expression (4).

$$CC(\tau) = \text{Max}[\text{Pub}(n) Pf(n+\tau)] \quad (4)$$

In expression (4), CC(τ) represents a cross power spectrum for an upward and a downward LPC spectrum in a case of delay time τ. The residual echo detecting unit 2120 changes the delay time τ from 1 to an integral multiple (for example, 100 ms) of frame length, at frame length intervals (for example, 20 nms), and computes the delay time τ that maximizes CC(τ) In a case where the maximum value of CC(τ) exceeds a predetermined threshold, the residual echo detecting unit 2120 determines that residual echo is present, and outputs a detection result and warning information to the output unit 2117.

The output unit 2117 collects the detection result and alarm information from each analyzing unit, and outputs these to the upper level device 2130 once each predetermined time, or each time an alarm is detected.

As described above, according to the fourth exemplary embodiment of the present invention, it is possible to detect audio quality deterioration due to a residual echo signal in a configuration shown in FIG. 1 where a gateway is present that mutually connects a PSTN network and an IP network, without the necessity to pass a test audio signal through a network in service or without embedding a test audio signal in a specific field of an audio packet.

Furthermore, with the method of detecting residual echo in the fourth exemplary embodiment of the present invention, it is possible to detect residual echo in a very small amount of processing, in comparison with a method of decoding an entire bit stream to reproduce signals and then computing spectral parameters from the reproduced signals and obtaining correlations, or a method of computing mutual correlations of the reproduced signals. A reason for this is that a method is employed where only the spectral parameters among upward and downward bit streams are decoded, and residual echo is detected by obtaining a correlation between the an upward spectrum and a downward spectrum.

Furthermore, the bit stream analyzing unit 2116 of the fourth exemplary embodiment described above can also be configured as described below.

Figure 11:
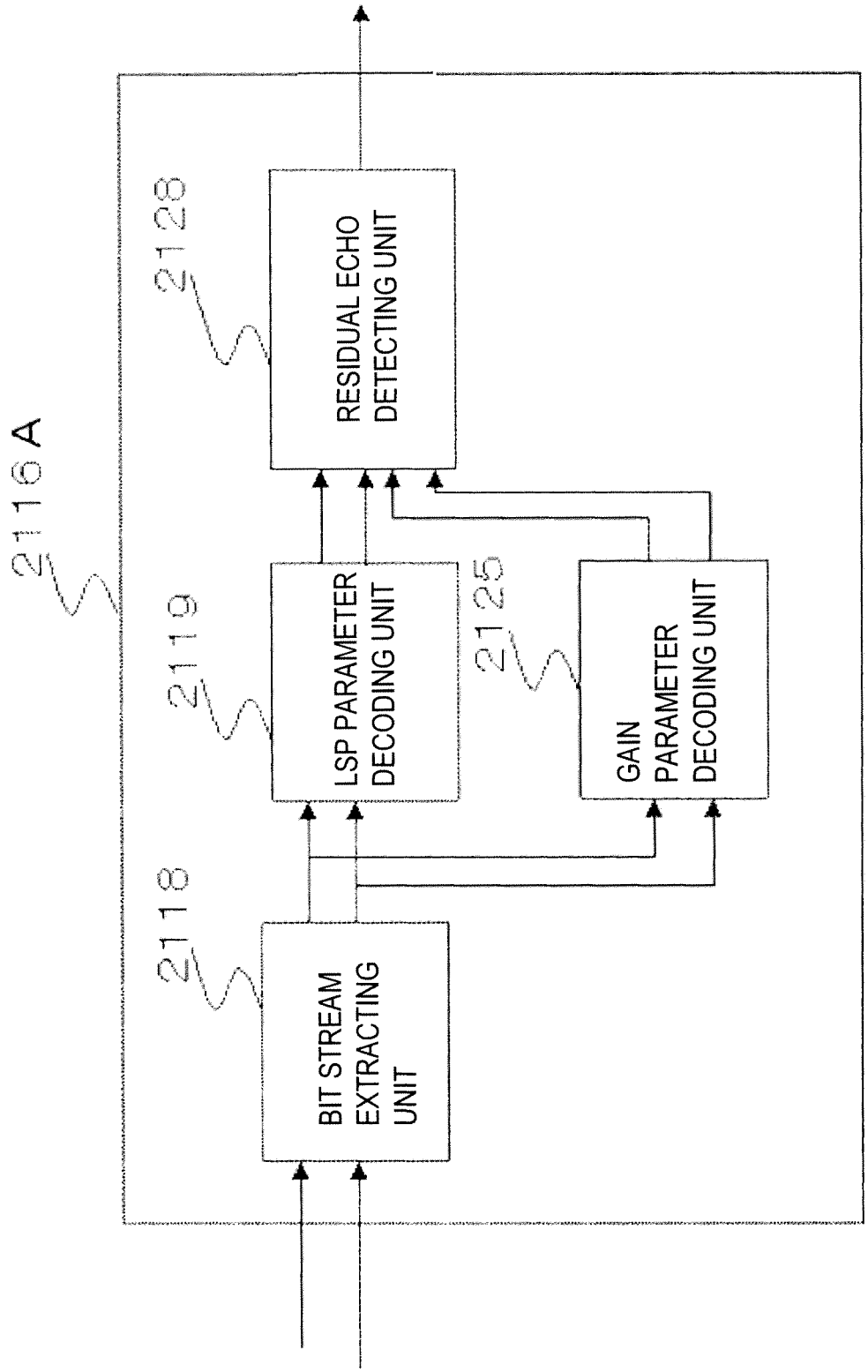
FIG. 11 is a diagram representing a modified exemplary embodiment of the bit stream analyzer of FIG. 9.

FIG. 11 is a block diagram showing a configuration of a modified exemplary embodiment of the bit stream analyzing unit. In FIG. 11, since component elements given the same numbers as FIG. 10 are equivalent to component elements of the fourth exemplary embodiment, a description thereof is omitted, and points of difference are described below.

A gain parameter decoding unit 2125 decodes both upward and downward directions with respect to 7 bits that are a fixed codebook gain among a bit stream of 244 bits for each frame, to obtain gain. Next, the gain parameter decoding unit 2125 determines whether or not the gain exceeds a predetermined value for each frame, and determines a silence frame for a frame less than or equal to the threshold and outputs this to a residual echo detecting unit 2128.

The residual echo detecting unit 2128 performs computation, in accordance with expression (4), of a cross power spectrum of upward and downward LPC spectra, but when performing this computation, a frame determined to be a silence frame in the gain parameter decoding unit 2125 is not included in the cross power spectrum computation. This is to prevent a misjudgment where, when the cross power spectrum at a silence frame is computed, correlation values become large.

As described above, according to the modified exemplary embodiment shown in FIG. 11, it is possible to detect residual echo with better accuracy in comparison with the configuration of FIG. 10.

Descriptions have been given above according to preferred exemplary embodiments of the present invention, but the present invention is not limited to only the abovementioned exemplary embodiments, and further modifications, substitutions, and adjustments are possible within a scope that does not depart from fundamental technological concepts of the present invention. For example, in the abovementioned exemplary embodiments, descriptions were given citing examples applied to analyses of audio quality of a mobile network, but application is also possible to audio quality analysis in broadband network, NGN, the Internet, and the like. However, in such a case, when AMR is used, a mobile-specific Iu UP protocol is not used as the RTP payload, and a RFC 3267 protocol is used, so that the RFC 3267 may be substituted in place of Iu UP. Furthermore, in a case where G.729 or G.711 is used, as described above, Iu UP is not used but it is possible to perform audio quality analysis in the same way as described above.

Finally, preferable modes of the present invention are summarized.

(First Mode)
(Refer to the audio quality analyzing device according to the first aspect described above.)

(Second Mode)
The audio quality analyzing device according to the first mode, wherein the device notifies a detection result to the upper level device at predetermined time intervals.

(Third Mode)
The audio quality analyzing device according to the first or second mode, wherein the device notifies a detection result to the upper level device when deterioration of audio quality is detected.

(Fourth Mode)
The audio quality analyzing device according to any one of the first to the third modes, wherein the audio quality analyzing unit detects an abnormality of a device based on a level estimated by decoding a parameter related to gain in a bit stream contained in a payload.

(Fifth Mode)
The audio quality analyzing device according to any one of the first to the fourth modes, wherein the audio quality analyzing unit detects an abnormality of a device based on an estimated level, by decoding a SID (Silence Insertion Descriptor) frame a bit stream contained in a payload.

(Sixth Mode)
The audio quality analyzing device according to any one of the first to the fifth modes, wherein the audio quality analyzing unit detects an abnormality of a device based on a level estimated by decoding an entire bit stream contained in a payload, in a case where an audio compression encoding method is ITU-T Recommendation G.7.11.

(Seventh Mode)
The audio quality analyzing device according to any one of the first to the sixth modes, wherein the device includes, as a network that picks up the packet, at least one of an IP (Internet Protocol) network, an NGN (Next Generation Network), the Internet, or a mobile network.

(Eighth Mode)
(Refer to the audio quality analyzing method according to the second aspect described above.)

(Ninth Mode)
(Refer to the program according to the third aspect described above.)

(Tenth Mode)
An audio quality analyzing device characterized by having a first audio quality analyzing unit that picks up from a network a first packet containing a bit stream obtained by compression encoding of audio sent by at least one terminal of at least two terminals, and in addition to analyzing a header of the first packet, detects deterioration of audio communication service quality by performing at least one of: an analysis of a payload header and an analysis of the bit stream contained in the payload; and a second audio quality analyzing unit that picks up from a network a second packet containing a control signal and analyzes the second packet; wherein a detection result of the first audio quality analyzing unit is verified by an analysis result of the second audio quality analyzing unit.

(Eleventh Mode)
The audio quality analyzing device according to the tenth mode, wherein the first and second audio quality analyzing units notify a detection result to an upper level device at predetermined time intervals, and the upper level device verifies a detection result of the first audio quality analyzing unit by an analysis result of the second audio quality analyzing unit.

(Twelfth Mode)
The audio quality analyzing device according to the tenth or eleventh mode, wherein the first audio quality analyzing unit notifies a detection result to the upper level device, when deterioration of audio quality is detected, and the upper level device verifies a detection result of the first audio quality analyzing unit by an analysis result of the second audio quality analyzing unit.

(Thirteenth Mode)
The audio quality analyzing device according to any one of the tenth to the twelfth modes, wherein the first audio quality analyzing unit detects an abnormality of a device based on a level estimated by decoding a parameter related to gain in a bit stream contained in a payload.

(Fourteenth Mode)
The audio quality analyzing device according to any one of the tenth to the thirteenth modes, wherein the first audio quality analyzing unit detects an abnormality of a device based on a level estimated by decoding a SID (Silence Insertion Descriptor) frame in a bit stream contained in a payload.

(Fifteenth Mode)
The audio quality analyzing device according to any one of the tenth to the fourteenth modes, wherein the first audio quality analyzing unit detects an abnormality of a device based on a level estimated by decoding an entire bit stream contained in a payload, in a case where an audio compression encoding method is ITU-T Recommendation G.711.

(Sixteenth Mode)
The audio quality analyzing device according to any one of the tenth to the fifteenth modes, wherein a control signal contained in the second packet is a SIP (Session Initiation Protocol) message.

(Seventeenth Mode)
The audio quality analyzing device according to any one of the tenth to the sixteenth modes including, as a network that picks up the first and second packets, at least one of an IP (Internet Protocol) network, an NGN (Next Generation Network), the Internet, or a mobile network.

(Eighteenth Mode)
An audio quality analyzing method characterized by including picking up from a network a first packet containing a bit stream obtained by compression encoding of audio sent by at least one terminal of at least two terminals, and a second packet containing a control signal; a first audio quality analyzing process analyzing a header of the first packet, and detecting deterioration of audio communication service quality by performing at least one of: an analysis of a payload header and an analysis of the bit stream contained in the payload; and a second audio quality analyzing process of analyzing the second packet; wherein a detection result of the first audio quality analyzing process is verified by an analysis result of the second audio quality analyzing process.

(Nineteenth Mode)
A program executing, on a computer configuring an audio quality analyzing device, a process of picking up from a network a first packet containing a bit stream obtained by compression encoding of audio sent by at least one terminal of at least two terminals, and a second packet containing a control signal; a first audio quality analyzing process of analyzing a header of the first packet, and detecting deterioration of audio communication service quality by performing at least one of: an analysis of a payload header and an analysis of the bit stream contained in the payload; a second audio quality analyzing process of analyzing the second packet; and a process of verifying a detection result of the first audio quality analyzing process by an analysis result of the second audio quality analyzing process.

(Twentieth Mode)

An audio quality analyzing device characterized by having an audio quality analyzing unit that picks up from a network respective upward and downward packets containing bit streams obtained by compression encoding of audio sent by respective terminals, during audio communication among terminals, decodes respective spectral parameters among hit the streams contained in payloads of the respective packets, and uses results of decoding in the upward and downward directions to obtain correlations between an upward spectrum and a downward spectrum, so as to detect whether or not there is residual echo, to be notified to an upper level device.

(Twenty-First Mode)

The audio quality analyzing device according to the twentieth mode, further characterized by decoding a parameter related to gain among bit the streams contained in payloads of the respective packets, and removing a silence frame identified by the gain, when obtaining a correlations between the upward spectrum and the downward spectrum.

(Twenty-Second Mode)

The audio quality analyzing device according to the twenty-first or twenty-second mode, wherein a line spectral pair (LSP) included in a bit stream is used as the spectral parameters.

(Twenty-Third Mode)

The audio quality analyzing device according to any one of the twentieth to the twenty-first modes, wherein the device converts a result of decoding the spectral parameters to linear predictive coding coefficients, and further converts to a linear predictive coding spectrum, obtains upward and downward linear predictive coding spectra or linear predictive coding cepstra while varying delay time in a prescribed range, and, in a case where a maximum among plural correlation values obtained by varying the delay time is larger than a prescribed threshold, determines that there is residual echo.

(Twenty-Fourth Mode)

The audio quality analyzing device according to any one of the twentieth to the twenty-third modes, wherein the device is provided with a function that, in addition to detecting the residual echo, detects a state of occurrence of packet loss, delay time, jitter amount, and bit error.

(Twenty-Fifth Mode)

The audio quality analyzing device according to any one of the twentieth to the twenty-fourth modes, wherein the device notifies a detection result to the upper level device at predetermined time intervals.

(Twenty-Sixth Mode)

The audio quality analyzing device according to any one of the twentieth to the twenty-fifth modes, wherein the device notifies a detection result to the upper level device, when residual echo is detected.

(Twenty-Seventh Mode)

The audio quality analyzing device according to any one of the twentieth to the twenty-sixth modes, wherein the device includes, as a network that picks up the packet, at least one of an IP (Internet Protocol) network, an NGN (Next Generation Network), the Internet, or a mobile network.

(Twenty-Eighth Mode)

An audio quality analyzing method including a step of picking up from a network respective upward and downward packets containing bit streams obtained by compression encoding of audio sent by respective terminals, during audio communication among terminals, a step of decoding respective spectral parameters among bit the streams contained in payloads of the respective packets, and a step of using results of decoding in the upward and downward directions to obtain a correlation between an upward spectrum and a downward spectrum, so as to detect whether or not there is residual echo, wherein, in a case where a value of a correlation is larger than a prescribed threshold, a determination is made that there is residual echo.

(Twenty-Ninth Mode)

A program executing, on a computer configuring an audio quality analyzing device, a process of picking up from a network respective upward and downward packets containing bit streams obtained by compression encoding of audio sent by respective terminals, during audio communication among terminals, a process of decoding respective spectral parameters among bit the streams contained in payloads of the respective packets, and a process of using results of decoding in the upward and downward directions to obtain a correlation between an upward spectrum and a downward spectrum, so as to detect whether or not there is residual echo, wherein, in a case where a value of a correlation is larger than a prescribed threshold, a determination is made by the computer that there is residual echo.

EXPLANATIONS OF SYMBOLS 110, 110A, 2110 audio quality analyzing device
111 packet receiving unit
112 RTP header analyzing unit
113 RTCP analyzing unit
114 RTP payload header analyzing unit
115, 117 output unit
116 bit stream analyzing unit
118 bit stream extracting unit
119 gain parameter decoding unit
120, 122 level estimating unit
121 bit stream decoding unit
130, 140 upper level device
145 monitoring device
150, 151 audio communication device
170, 171 mobile terminal
180 mobile core network
190, 191 wireless network
1110 U-Plane analyzing unit
1130 C-Plane analyzing unit
2111 packet receiving unit
2112 RTP header analyzing unit
2113 RTCP analyzing unit
2114 RTP payload header analyzing unit
2117 output unit
2116, 2116A bit stream analyzing unit
2118 hit stream extracting unit
2119 LSP parameter decoding unit
2120, 2128 residual echo detecting unit
2125 gain parameter decoding unit
2151 gateway device
2171 telephone terminal
2191 PSTN network

The invention claimed is:

1. An audio quality analyzing device, comprising:
a first audio quality analyzing unit that picks up from a network a packet containing a bit stream obtained by a compression encoding of an audio sent by at least one terminal, during an audio communication among terminals, and, in addition to analyzing a header of said packet, the first audio quality analyzing unit:
detects a deterioration of audio communication service quality by performing
at least one of an analysis of a payload header and an analysis of the bit stream contained in said payload;
notifies a detection result to an upper level device,
wherein the first audio quality analyzing unit detects an abnormality of a device based on a level estimated by decoding a parameter related to a gain in the bit stream contained in said payload;
a second audio quality analyzing unit that picks up from a network a second packet containing a control signal and analyzes said second packet; and
wherein a detection result of the first audio quality analyzing unit is verified by an analysis result of the second audio quality analyzing unit.

2. The audio quality analyzing device according to claim 1, wherein said first audio quality analyzing unit detects an abnormality of a device based on a level estimated by decoding a SID (Silence Insertion Descriptor) frame in the bit stream contained in said payload.

3. The audio quality analyzing device according to claim 1, wherein said first audio quality analyzing unit detects the abnormality of the device based on the level estimated by decoding an entirely of the bit stream contained in said payload, in a case where an audio compression encoding method includes ITU-T Recommendation G.711.

4. The audio quality analyzing device according to claim 1, comprising, instead of said first audio quality analyzing unit, a third audio quality analyzing unit that picks up from a network respective upward and downward packets containing bit streams obtained by compression encoding of audio sent by respective terminals, during audio communication among the terminals, decodes respective spectral parameters among the bit streams contained in payloads of said respective packets, and uses results of decoding in said upward and downward directions to obtain a correlation between an upward spectrum and a downward spectrum, so as to detect whether or not there is a residual echo, and notifies an upper level device.

5. The audio quality analyzing device according to claim 4, wherein said third audio quality analyzing unit decodes the parameter related to said gain among the bit stream contained in said payloads of said respective packets, and removes a silence frame identified by said gain, when a correlation between said upward spectrum and downward spectrum are obtained.

6. The audio quality analyzing device according to claim 4, wherein line spectral pair (LSP) parameters included in a bit stream are used as said spectral parameters.

7. The audio quality analyzing device according to claim 4, wherein said device converts a result of decoding said spectral parameters to linear predictive coding coefficients, and further converts to a linear predictive coding spectrum or a linear predictive coding cepstrum, obtains upward and downward linear predictive coding spectra or the linear predictive coding cepstra while varying a delay time in a prescribed range, and in a case where a maximum among plural correlation values, obtained by varying said delay time, is larger than a prescribed threshold, determines that there is a residual echo.

8. The audio quality analyzing device according to claim 3, further comprising a function that, in addition to detecting a residual echo, detects a state of an occurrence of a packet loss, a delay time, a jitter amount, and a bit error.

9. The audio quality analyzing device according to claim 1, wherein said device notifies a detection result to said upper level device at predetermined time intervals.

10. The audio quality analyzing device according to claim 1, wherein said device notifies a detection result to said upper level device, when a deterioration of an audio quality or a residual echo is detected.

11. The audio quality analyzing device according to claim 1, wherein said device further comprises, as a network that picks up said packet, at least one of an IP (Internet Protocol) network, an NGN (Next Generation Network), Internet, or a mobile network.

12. An audio quality analyzing method, comprising:
picking up from a network a packet containing a bit stream obtained by a compression encoding of an audio sent by at least one terminal during an audio communication among terminals;
analyzing a header of said packet and performing at least one of an analysis of a payload header and an analysis of the bit stream contained in said payload, and detecting deterioration of audio communication service quality based on said analysis result;
notifying a detection result to an upper level device;
detecting an abnormality of a device based on a level estimated by decoding a parameter related to a gain in the bit stream contained in said payload;
picking up from a network another packet containing a control signal and analyzing said second packet; and
wherein a detection result of said picking up the packet containing the bit stream is verified by an analysis result of said picking up another packet containing the control signal.

13. The audio quality analyzing method according to claim 12, wherein, instead of said picking up from the network the packet containing the bit stream obtained by the compression encoding of the audio sent by said at least one terminal during the audio communication among the terminals, said analyzing the header of said packet and said performing said at least one of the analysis of the payload header and the analysis of the bit stream contained in said payload, and said detecting the deterioration of the audio communication service quality based on said analysis result and notifying the detection result to the upper level device, said method comprises:
picking up from a network respective upward and downward packets containing bit streams obtained by compression encoding of audio sent by respective terminals, during audio communication among terminals, decoding respective spectral parameters among bit the streams contained in payloads of said respective packets, and using results of decoding in said upward and downward directions to obtain a correlation between an upward spectrum and a downward spectrum, so as to detect whether or not there is a residual echo,
wherein, in a case where a value of said correlation is larger than a prescribed threshold, a determination is made that there is the residual echo.

14. A non-transitory computer readable-recording medium storing therein a computer program executing, on a computer configuring an audio quality analyzing device:
picking up from a network a packet containing a bit stream obtained by a compression encoding of an audio sent by at least one terminal during an audio communication among terminals;

analyzing a header of said packet and performing at least one of an analysis of a payload header and an analysis of the bit stream contained in said payload;

detecting a deterioration of audio communication service quality based on said analysis result and notifying a detection result to an upper level device;

detecting an abnormality of a device based on a level estimated by decoding a parameter related to a gain in the bit stream contained in said payload;

picking up from a network another packet containing a control signal and analyzing said second packet; and wherein a detection result of said picking up the packet containing the bit stream is verified by an analysis result of said picking up another packet containing the control signal.

15. The audio quality analyzing device according to claim 1, wherein said first audio quality analyzing unit detects an abnormality of a device based on a level estimated by decoding a SID (Silence Insertion Descriptor) frame in the bit stream contained in said payload.

16. The audio quality analyzing device according to claim 1, wherein said first audio quality analyzing unit detects an abnormality of a device based on a level estimated by decoding an entirely of the bit stream contained in said payload, in a case where an audio compression encoding method includes ITU-T Recommendation G.711.

17. The audio quality analyzing device according to claim 1, further comprising a function that detects a residual echo, a state of an occurrence of a packet loss, a delay time, a jitter amount, and a bit error.

18. The audio quality analyzing device according to claim 1, further comprising a function that detects a residual echo, a delay time, a jitter amount, and a bit error.

* * * * *